US007054177B2

(12) United States Patent
Wu

(10) Patent No.: US 7,054,177 B2
(45) Date of Patent: May 30, 2006

(54) POWER ADAPTER

(75) Inventor: Jui Hsiung Wu, Taipei (TW)

(73) Assignee: Well Shin Technology Co., Ltd., Taipei (TW)

( * ) Notice: Subject to any disclaimer, the term of this patent is extended or adjusted under 35 U.S.C. 154(b) by 248 days.

(21) Appl. No.: 10/790,105

(22) Filed: Mar. 2, 2004

(65) Prior Publication Data

US 2005/0194946 A1 Sep. 8, 2005

(51) Int. Cl.
*H02M 1/00* (2006.01)
*H01R 13/60* (2006.01)

(52) U.S. Cl. .................................................... 363/146

(58) Field of Classification Search ................ 363/144, 363/146; 439/170, 218, 224, 536, 538, 638
See application file for complete search history.

(56) References Cited

U.S. PATENT DOCUMENTS 6,057,610 A * 5/2000 Nierescher .................. 307/72
6,169,341 B1 * 1/2001 Nagai .......................... 307/82
6,172,892 B1 * 1/2001 Plichta et al. ............... 363/146
6,845,023 B1 * 1/2005 Philips et al. ............... 363/132
6,879,497 B1 * 4/2005 Hua et al. ..................... 363/16

* cited by examiner

*Primary Examiner*—Matthew V. Nguyen
(74) *Attorney, Agent, or Firm*—Rosenberg, Klein & Lee

(57) ABSTRACT

The present invention provides a power adapter which includes a power input connector, a voltage transfer and a power output connector. The power input and output connectors connect conductively to the voltage transfer, and the power input connector engages with a DC power to transmit an input DC to the voltage transfer. The voltage transfer includes a voltage conversion circuit, a multi-transfer switch and a selective resistance network. The voltage conversion circuit conducts the selective resistance network through a multi-transfer manipulation of the multi-transfer switch, further achieves various specific resistance values. In accordance with this, the input DC is converted correspondingly various output DC with specific voltages for various electronic apparatuses.

3 Claims, 5 Drawing Sheets

POWER ADAPTER

BACKGROUND OF THE INVENTION

1. Field of the Invention

The present invention relates generally to a power adapter, and especially to a power adapter which is capable of converting correspondingly an single input DC (Direct Current) into a plurality of different output DC with specific voltage values for various different electronic apparatuses.

2. The Related Art

At present, the various electronic apparatuses used by a consumer are more and more, such as the wireless telephone, CD Walkman, modem, mobile phone and note book etc. When the user requires using one of the various electronic apparatuses, because these consumer electronics each adopt a corresponding DC for a specific operation power, it is necessary to provide a DC power adapter for the various electronic apparatuses to convert an single input DC (Direct Current) into a plurality of different output DC with specific voltage value.

However, the present power adapter only provides a single output DC with a specific voltage value corresponding with a rated operation voltage value of the specific electronic apparatus. In a using condition of the various electronic apparatus, the user must equip with a plurality of specific power adapters to provide correspondingly the rated operation voltage value for each electronic apparatuses. With this result, it makes more troubles for the user to bring and using these, especially as the user goes out for a journey or business travel.

SUMMARY OF THE INVENTION

Thus, an object of the present invention is to provide a power adapter which is capable of converting correspondingly the single input DC into various output DC with the specific voltage value for the various electronic apparatuses, such as a mobile phone, a video camera, a outboard disc drive, a DVD or VCD players etc., further providing a simply and convenient use for the user.

To attain the above object, the present invention provides a power adapter, which comprises a power input connector, a voltage transfer and a power output connector. The power input connector connects electrically with a DC power and the voltage transfer to transmit an input DC to the voltage transfer. The power output connector engages with the voltage transfer. The voltage transfer includes a voltage conversion circuit, a multi-transfer switch and a selective resistance network. The voltage conversion circuit defines an input interface, a reference interface and an output interface. The input interface conducts the power input connector, and the output interface conducts the power output connector. The multi-transfer switch includes a common interface and a plurality of transfer interface. The common interface conducts selectively the transfer interfaces by means of a transfer manipulation of the multi-transfer switch and also conducts the reference interface of the voltage conversion circuit. The selective resistance network comprises a plurality of resistance interface. The different resistance interface represents different resistance values and conducts the corresponding transfer interface of the multi-transfer interface respectively.

As using, the power adapter converts correspondingly the input DC into a specific output DC for various different electronic apparatuses. With this result, the user needn't to bring and use various specific power adapters for the various specific electronic apparatuses respectively. Thereby the power adapter of the present invention provides a simply and convenient use for the user.

BRIEF DESCRIPTION OF THE DRAWINGS

A detailed explanation of a preferred embodiment of the present invention will be given, with reference to the attached drawings, for better understanding thereof to those skilled in the art.

DETAILED DESCRIPTION OF THE PREFERRED EMBODIMENT

Figure 1:
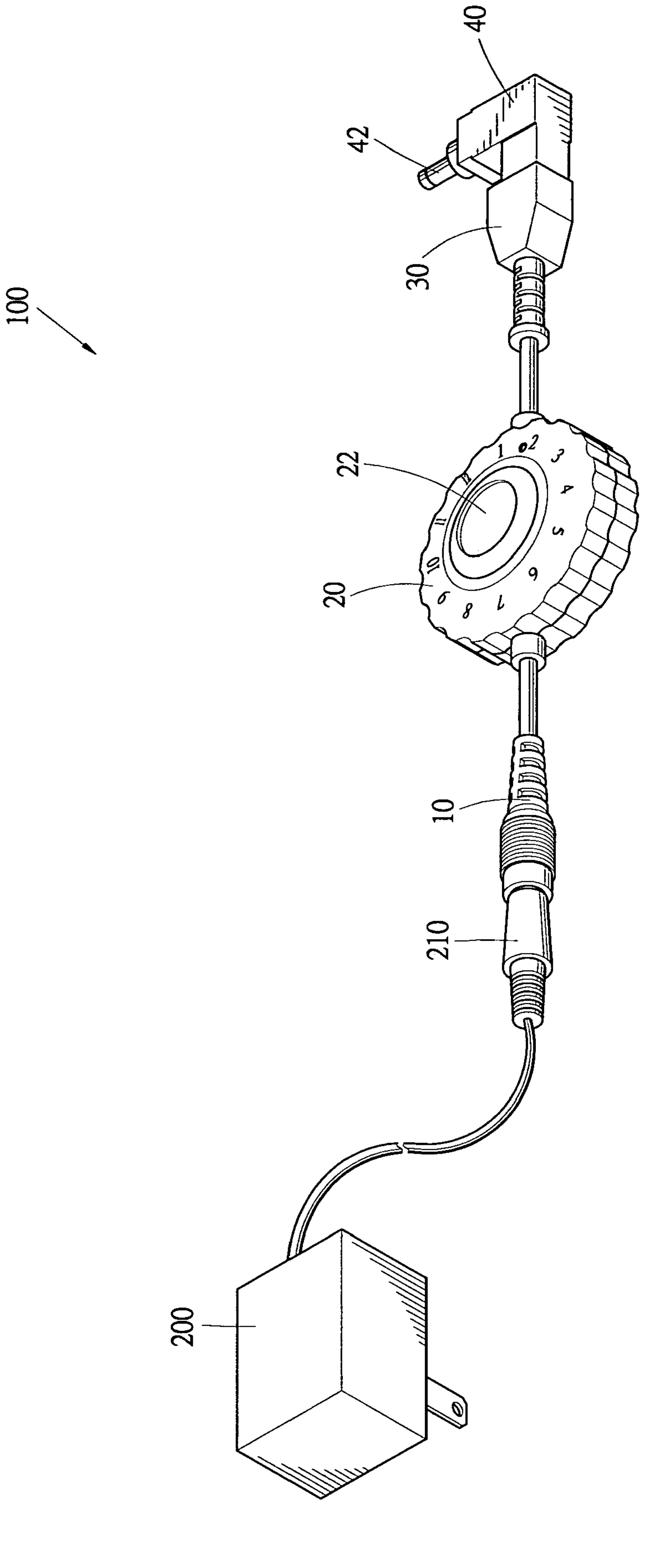
FIG. 1 is a perspective view of a power adapter in accordance with the present invention and an exterior DC power.
Figure 2:
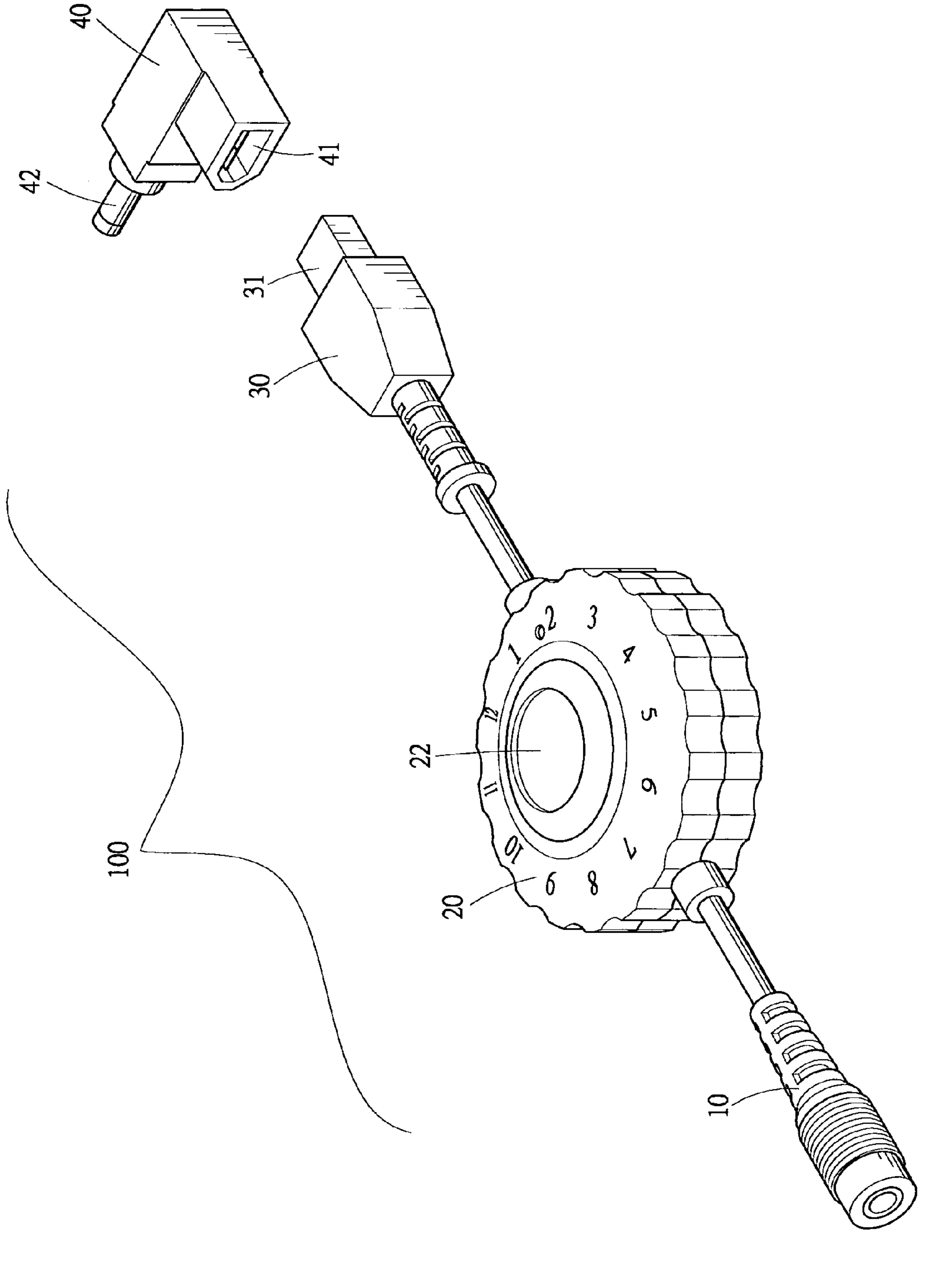
FIG. 2 is a perspective view of the power adapter shown in FIG. 1 with an output adapter seperated.
Figure 3:
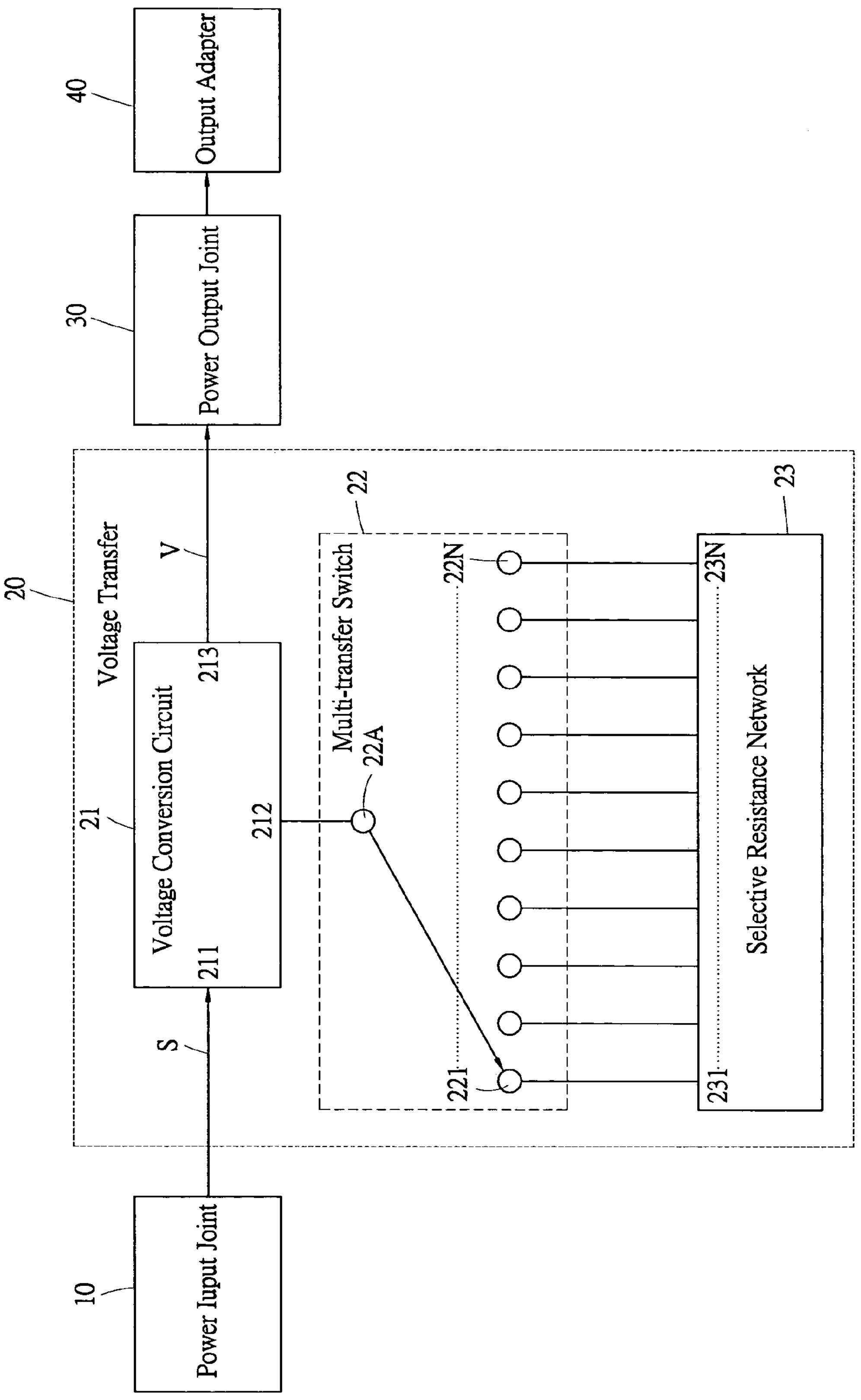
FIG. 3 is a block circuit diagram of the power adapter.

With reference to FIGS. 1, 2 and 3, a power adapter in accordance with the present invention generally designed with reference numeral 100, comprises a power input connector 10, a voltage transfer 20, a power output connector 30 and a plurality of output adapters 40.

One end of the power input connector 10 engages with an output plug 210 of an exterior DC power 200, the other end connects conductively the voltage transfer 20. The DC power 200 provides a single input DC S which is transmitted to the voltage transfer 20. As described in the power adapter 100 of the present invention, the DC power 200 may be a notebook DC power, a car battery or other power apparatuses else.

One end of the power output connector 30 connects conductively the voltage transfer 20, and the other end forms a first connecting part 31. The output adapter defines a second and third connecting parts 41, 42 to engage with the first connecting part 31 and an exterior electronic apparatus respectively (as shown in FIGS. 4 and 5).

Further referring to FIG. 3, the voltage transfer 20 includes a voltage conversion circuit 21, a multi-transfer switch 22 and a selective resistance network 23. The voltage conversion circuit 21 comprises an input interface 211, a reference interface 212 and an output interface 213. The input interface 211 connects conductively the power input connector 10 for the purpose of transmitting the input DC S. The output interface 213 converts a voltage value of the input DC S into a corresponding voltage value of an output DC V in accordance with different specific resistance of the reference interface 212. The multi-transfer switch 22 defines a common interface 22A and a plurality of transfer interfaces 221~22N. The common interface 22A conducts electrically the reference interface 212 of the voltage conversion circuit 21. The common interface 22A conduct selectively the transfer interfaces 221~22N by means of a transfer manipulation of the multi-transfer switch 22. The selective resistance network 23 has a plurality of resistance interface 231~23N. The different specific resistance interface 231~23N represent the different specific resistance values and conduct the corresponding transfer interface 221~22N of the multi-transfer switch 22 respectively.

In the application condition of the power adapter 100, the voltage value of the output DC V is dependent on a conductive status between the reference interface 212 and the resistance interfaces 231~23N. When the multi-transfer switch 22 transfers to conduct selectively the resistance interface 231~23N someone, a specific resistance value can be achieved by the voltage conversion circuit 21. In this consequence, the voltage value of the input DC S is converted correspondingly into a specific voltage value of the output DC V in accordance with the specific resistance value. Then the output DC V is transmitted to the exterior electronic apparatus through the second and the third connecting parts 41,42 of the output adapter 40.

Figure 4:
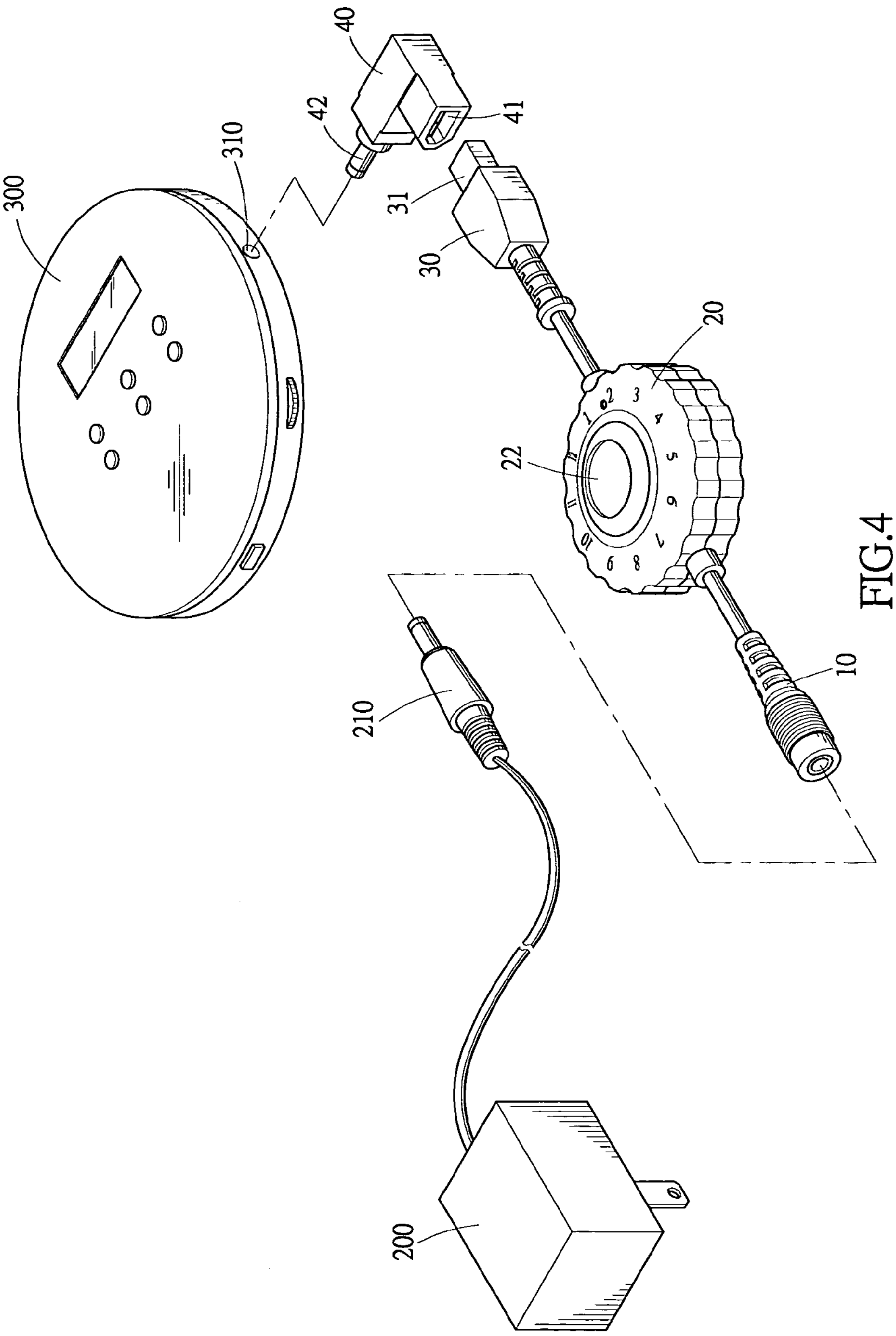
FIG. 4 is a perspective view showing the power adapter applying to a CD Walkman.
Figure 5:
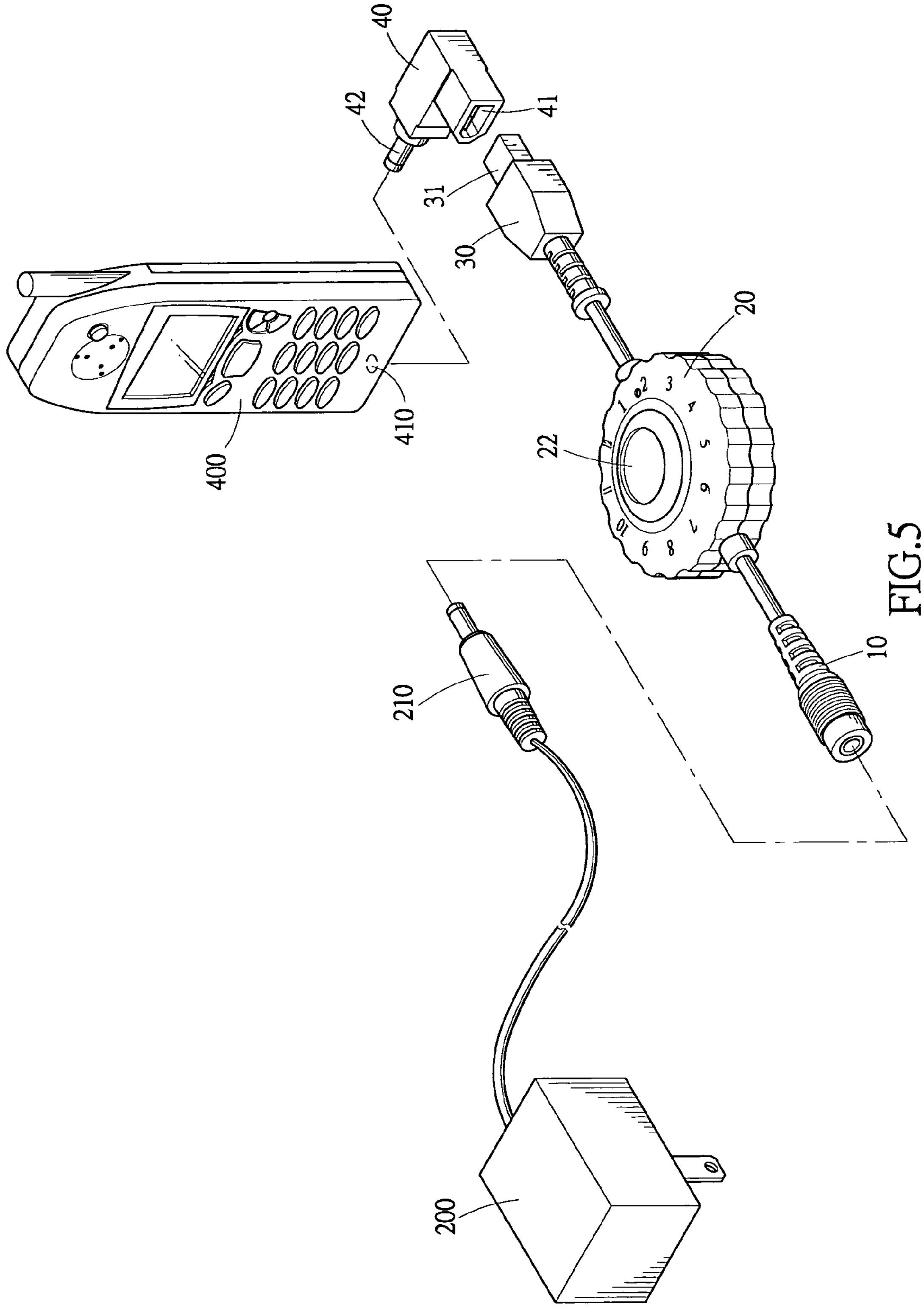
FIG. 5 is perspective view showing the power adapter applying to a mobile phone.

Referring now to FIG. 4, showing the power adapter 100 applying to a CD Walkman 300. In this application embodiment, the third connecting part 41 of the output adapter 40 inserts into a power receptacle 310 of the CD Walkman 300. In an operation condition, the power adapter 100 converts correspondingly the single input DC S into the specific output DC V with the rated operation voltage for the CD Walkman 300 by means of a corresponding transfer manipulation of the multi-transfer switch 22.

With referring to FIG. 5, showing the power adapter 100 applying to a mobile phone 400. In this application embodiment, the third connecting part 51 of the output adapter 50 inserts into a charging receptacle 410 of the mobile phone 400. In the same way, the power adapter 100 converts correspondingly the input DC S into the specific output DC V with the rated operation voltage for the mobile phone 400 by means of a corresponding transfer manipulation of the multi-transfer switch 22.

Further referring to FIG. 1, in order to avoid an accidental touch or a wrong operation to the multi-transfer switch 22 and protect the exterior electronic apparatus, the voltage transfer 20 further comprises an automatic disconnection device (not shown) and a start button 24. In a using condition of the power adapter 100, once the multi-transfer switch 22 is moved by the accidental touch or the wrong operation, the voltage transfer 20 will start the automatic disconnection device, and the power supply will be cut off until the start button 24 is pressed.

As described above, when the user uses the various electronic apparatuses, he (she) only needs to correspondingly replacement the output adapter 40,50 and manipulate simply the multi-transfer switch 22, and the input DC S provided by a single DC power 200 is capable of being converted into the different specific output DC V for the various corresponding electronic apparatuses. With this result, the user needn't to bring and use various specific power adapters for the various specific electronic apparatuses respectively. Thereby the power adapter 100 of the present invention provides a simply and convenient use for the user.

Although a particular embodiment of the invention has been described in detail for purposes of illustration, additional advantages and modifications will readily appear to those skilled in the art, and various modifications and enhancements may be made without departing from the spirit and scope of the invention, for example, the input power could not be designed a DC power but a AC power. Accordingly, the invention is not to be limited except as by the appended claims.

What is claimed is:

1. A power adapter comprising:

a power input connector connected an DC power to transmit an input DC;

a voltage transfer which includes a voltage conversion circuit, a multi-transfer switch and a selective resistance network, the voltage conversion circuit including an input interface, a reference interface and an output interface, the input interface conducting the power input connector; the multi-transfer switch including a common interface and a plurality of transfer interface, the common interface conducting selectively the transfer interfaces by means of a transfer manipulation of the multi-transfer switch and also conducting the reference interface of the voltage conversion circuit; the selective resistance network including a plurality of resistance interface, the different resistance interface representing different resistance values and conducting the corresponding transfer interface of the multi-transfer interface respectively; and a power output connector conducting the output interface and engaging with the voltage transfer.

2. The power adapter as claimed in claim 1, further comprising an output adapter, which one end engages with the power output connector and the other end engages with an exterior electronic apparatus.

3. The power adapter as claimed in claim 1, wherein the voltage transfer further comprises an automatic disconnection device and a start button, once the multi-transfer switch is moved by an accidental touch or a wrong operation, the voltage transfer will start the automatic disconnection device, and the power supply will be cut off until the start button is pressed.

* * * * *